United States Patent [19]

Nakajima et al.

[11] Patent Number: 4,842,691

[45] Date of Patent: Jun. 27, 1989

[54] SIZING AGENTS IN NEUTRAL RANGE AND SIZING METHODS USING THE SAME

[75] Inventors: Masato Nakajima, Katano; Toshiaki Otsuki, Neyagawa; Atsushi Ikeda, Takarazuka, all of Japan

[73] Assignee: Arakawa Chemical Industries, Ltd., Osaka, Japan

[21] Appl. No.: 24,030

[22] Filed: Mar. 10, 1987

[30] Foreign Application Priority Data

Mar. 19, 1986 [JP] Japan .................................. 61-63725
Apr. 21, 1986 [JP] Japan .................................. 61-91448

[51] Int. Cl.$^4$ ............................................... D21H 3/02
[52] U.S. Cl. ..................................... 162/158; 162/179; 162/180; 106/218; 106/238
[58] Field of Search .................... 162/158, 180, 179; 106/238, 218

[56] References Cited

U.S. PATENT DOCUMENTS

| | | | |
|---|---|---|---|
| 3,044,890 | 7/1962 | Boughton et al. | 106/238 |
| 3,251,732 | 5/1966 | Aldrich | 162/180 X |
| 4,591,412 | 5/1986 | Hechler | 162/158 |

*Primary Examiner*—Peter Chin
*Assistant Examiner*—Thi Dang
*Attorney, Agent, or Firm*—Larson and Taylor

[57] ABSTRACT

This invention provides a sizing agent (A) to be used in neutral range in papermaking, the sizing agent being characterized in that it is an aqueous dispersion of a reaction product prepared by reacting, in a specific proportion, (i) a rosin compound and (ii) at least one polyhydric alcohol selected from among a trihydric alcohol and a tetrahydric alcohol both consisting of carbon, hydrogen and oxygen, and a sizing method using the sizing agent (A) in neutral range at a pH of about 6 to about 9 in papermaking. And this invention further provides a sizing agent (B) to be used in neutral range in papermaking, the sizing agent being characterized in that it is an aqueous dispersion of a reaction product prepared by reacting, in a specific proportion, (i) a rosin compound, (ii) at least one polyhydric alcohol selected from among a trihydric alcohol and a tetrahydric alcohol both consisting of carbon, hydrogen and oxygen and (iii) a $\alpha,\beta$-unsaturated carboxylic acid derivative, and a sizing method using the sizing agent (B) in neutral range at a pH of about 6 to about 9 in papermaking.

16 Claims, No Drawings

SIZING AGENTS IN NEUTRAL RANGE AND SIZING METHODS USING THE SAME

The present invention relates to novel sizing agents to be used in neutral range at a pH of about 6 to about 9 and sizing methods using the sizing agent in the production of paper.

In recent years, research efforts have been made to explore compounds in an attempt to develop sizing agents useful in neutral range and sizing methods using the same in papermaking in view of the drawbacks resulting from paper sizing in acid range, such as damages to paper machine and paper quality increasingly degraded with time. For example, alkenyl succinic anhydride (U.S. Pat. No. 3,102,064) and alkyl ketene dimer (U.S. Pat. No. 3,130,118) have been used as sizing agents in neutral range in the manufacture of paper. Recently a rosin reinforced compound with formaldehyde and/or a $\alpha,\beta$-unsaturated carbonyl and additionally esterified with a tertiary amino alcohol has been proposed as a sizing agent in neutral range in papermaking (U.S. Pat. No. 4,540,635).

Of these sizing agents, however, alkenyl succinic anhydride cannot be retained as an aqueous dispersion owing to its low stability to hydrolysis and thus must be dispersed into an emulsion immediately before paper sizing in papermaking, resulting in reduced operational efficiency. The compound has another disadvantage of being expensive. Alkyl ketene dimer takes much time to exhibit the sizing effect, consequently producing only a low degree of sizing effect just after papermaking. Further the dimer is more expensive than alkenyl succinic anhydride and thus increases papermaking costs. In addition, reinforced rosin esterified with a tertiary amino alcohol is unsatisfactory in sizing effect.

Heretofore widely used for paper sizing in acid range are soap-type sizing agents prepared by saponifying a rosin or reinforced rosin with an alkali metal hydroxide or emulsion-type sizing agents prepared by dispersing the same with a dispersing agent. However, since these sizing agents used in neutral range display insufficient sizing effect, it is unavoidable to use the sizing agents in acid range at a pH of less than 6 in combination with aluminum sulfate as a fixing agent. The reason why these sizing agents are poor in sizing effect when used in neutral range remains to be clarified. Presumably the rosin or reinforced rosin is partially migrated to water whereby a reduced amount of the rosin remains in the pulp. The paper sizing in acid range is also defective in that it can not use calcium carbonate which is an inexpensive filler.

It is an object of the present invention to provide novel and effective sizing agents to be used in a neutral range which are free from the drawbacks of conventional sizing agents in neutral range and are satisfactory in any of sizing effect, operational efficiency and papermaking costs.

It is another object of the invention to provide sizing methods using the sizing agents in the manufacture of paper with excellent sizing effect which methods are free from the drawbacks resulting from conventional paper sizing in acid or neutral range.

These and other object of the present invention will become apparent from the following description.

The present invention provides a sizing agent (A) to be used in neutral range in papermaking, the sizing agent being characterized in that it is an aqueous dispersion of a reaction product prepared by reacting a (i) a rosin cmpound and (ii) at least one polyhydric alcohol selected from among a trihydric alcohol and a tetrahydric alcohol both consisting of carbon, hydrogen and oxygen in such proportion that the ratio of equivalent of hydroxyl group in the polyhydric alcohol (ii) to equivalent of carboxyl group in the rosin compound (i) is 0.2–1.5:1, and a sizing method using the sizing agent (A) in neutral range at a pH of about 6 to about 9 in papermaking.

The present invention further provides a sizing agent (B) to be used in neutral range in papermaking, the sizing agent being characterized in that it is an aqueous dispersion of a reaction product prepared by reacting (i) a rosin compound, (ii) at least one polyhydric alcohol selected from among a trihydric alcohol and a tetrahydric alcohol both consisting of carbon, hydrogen and oxygen and (iii) a $\alpha,\beta$-unsaturated carboxylic acid derivative in such proportion that the ratio of equivalent of hydroxyl group in the polyhydric alcohol (ii) to equivalent of carboxyl group in the rosin compound (i) is 0.2–1.5:1, and a sizing method using the sizing agent (B) in neutral range at a pH of about 6 to about 9 in papermaking.

The term "rosin compound" used herein refers to gum rosin, tall oil rosin, wood rosin and these rosins modified. Modified rosins useful in this invention include hydrogenated rosins, disproportionated rosins and formaldehyde-modified rosins.

The term "rosin ester" used herein refers to an ester produced by condensation reaction of a rosin compound and at least one polyhydric alcohol selected from among a trihydric alcohol and a tetrahydric alcohol both consisting of carbon, hydrogen and oxygen, and encompasses a product of complete esterification and a product of partial esterification.

Our research revealed the following surprising facts:

(1) an outstanding sizing effect can be produced when using, in neutral range at a pH of about 6 to about 9, the sizing agent of the present invention, i.e. an aqueous dispersion containing a rosin ester produced by reacting, in the above-specified proportion, a rosin compound and at least one polyhydric alcohol selected from among a trihydric alcohol and a tetrahydric alcohol consisting of carbon, hydrogen and oxygen;

(2) a more excellent sizing effect can be achieved when using, in neutral range at a pH of about 6 to about 9, an aqueous dispersion containing said specific rosin ester modified with a $\alpha,\beta$-unsaturated carboxylic acid derivative;

(3) the aqueous dispersion used in the item (1) or (2) has a high storage stability and thus can be used as it is in the sizing operation, hence high in operational efficiency; and (4) the aqueous dispersion used in the item (1) or (2) is relatively inexpensive so that lower papermaking costs result, particularly in view of calcium carbonate being usable.

The present invention has been accomplished based on these novel findings.

The dispersion phase of the sizing agent (A) in the invention to be used in neutral range is composed of a reaction product prepared by heating, in a specific proportion, (i) a rosin compound and (ii) at least one polyhydric alcohol selected from among a trihydric alcohol and a tetrahydric alcohol both consisting of carbon, hydrogen and oxygen, the reaction product being obtained in the form of polyhydric alcohol ester of rosin compound or a mixture of the same and rosin compound.

The dispersion phase of the sizing agent (B) in the invention to be used in neutral range is composed of a reaction product prepared by reacting (i) a rosin compound, (ii) at least one polyhydric alcohol selected from among a trihydric alcohol and a tetrahydric alcohol both consisting of carbon, hydrogen and oxygen and (iii) a $\alpha,\beta$-unsaturated carboxylic acid derivative in a specific proportion, the reaction product being the rosin compound esterified with the predetermined amount of specific polyhydric alcohol and modified with the $\alpha,\beta$-unsaturated carboxylic acid derivative.

It is essential in the present invention to use at least one polyhydric alcohol selected from among a trihydric alcohol and a tetrahydric alcohol both consisting of carbon, hydrogen and oxygen. The use of monohydric alcohol, dihydric alcohol, amino alcohol or the like results in failure to achieve the contemplated objects of the present invention. Examples of preferred trihydric and tetrahydric alcohols are those having about 3 to about 7 carbon atoms. Specific examples thereof are glycerin, trimethylolethane, trimethylol-propane, 3-methylpentane-1,3,5-triol and like trihydric alcohols and pentaerythritol, diglycerin and like tetrahydric alcohols. These alcohols are usable singly or at least two of them can be used in mixture.

The reaction product which is the dispersion phase of the sizing agent (A) in the present invention can be formed by reacting the rosin compound and the polyhydric alcohol(s) under known esterification conditions. More specifically, the roin compound and polyhydric alcohol are subjected to condensation reaction with stirring at a temperature of about 150° to about 300° C. under a normal, reduced or elevated pressure depending on the boiling point of the polyhydric alcohol for about 3 to about 40 hours. When required, the condensation reaction can be performed in the presence of a solvent such as benzene, toluene, xylene and the like in an azeotropic state.

The rosin compound and the polyhydric alcohol are used essentially in a ratio of equivalent of hydroxyl group of polyhydric alcohol to equivalent of carboxyl group of rosin compound of 0.2–1.5:1. Preferred range is 0.4–1.2:1. Use of the rosin compound and polyhydric alcohol in a ratio of less than 0.2:1 is undesirable because the sizing agent used in neutral range exhibits insufficient sizing effect. Use of the rosin compound and polyhydric alcohol in a ratio of over 1.5:1 produces an ester of rosin compound and polyhydric alcohol containing a large amount of free hydroxyl groups, causing the sizing agent to achieve a reduced sizing effect due to the presence of remaining hydroxyl groups, hence undesirable.

The reaction product thus obtained comprises any of various combinations of: a complete esterification product wherein the hydroxyl groups of polyhydric alcohol are wholly esterified with the carboxyl groups of rosin compound; a partial esterification product wherein the hydroxyl groups of polyhydric alcohol are partially esterified with the carboxyl groups of rosin compound; and unreacted materials. According to the present invention, the reaction product per se can be used as the dispersion phase of sizing agent (A).

The reaction product usually contains the rosin ester in an amount of at least about 20% by weight, preferably at least 40% by weight, based on the solids. A rosin compound, $\alpha,\beta$-unsaturated carboxylic acid derivative-modified rosin compound or the like can be added to the aqueous dispersion of the invention, when so required. In this case, the dispersion after addition contains the rosin ester in an amount of preferably at least about 20% by weight, more preferably at least about 40% by weight, based on the solids. The content of more than 40% by weight serves to further improve the sizing property of sizing agent. Presence of less than 20% by weight of the esterification product(s) gives a sizing agent which produces a lower sizing effect, hence undesirable.

The reaction product which is the dispersion phase of the sizing agent (B) in the present invention is prepared by modifying the rosin compound (i) or the reaction product with a $\alpha,\beta$-unsaturated carboxylic acid derivative in the preparation of dispersion phase of the sizing agent (A). The modification further enhances the sizing effect of sizing agent in neutral range. Examples of $\alpha,\beta$-unsaturated carboxylic acid derivatives useful in the invention are maleic anhydride, maleic acid, monoester or diester of maleic acid (prepared from lower alcohol having 1 to 4 carbon atoms such as alkyl alcohol and maleic anhydride), fumaric acid, N-alkylmaleimide, itaconic acid, itaconic anhydride, etc. Of these derivatives, preferable are maleic anhydride, maleic acid, monoester of maleic acid, itaconic acid and itaconic anhydride.

The reaction product which is the dispersion phase of the sizing agent (B) in the present invention is prepared by reacting (i) the rosin compound, (ii) the above-specified polyhydric alcohol and (iii) the $\alpha,\beta$-unsaturated carboxylic acid derivative in sequence or at the same time. The term "sequence" is used herein to include a case wherein the component (iii) is reacted after reaction of the rosin compound (i) and the polyhydric alcohol (ii) and a case wherein the polyhydric alcohol (ii) is reacted after reaction of the rosin compound (i) and component (iii).

We will describe below the reaction in the former case. First the rosin compound (i) and the polyhydric alcohol (ii) are reacted under conventional esterification conditions. The rosin compound and polyhydric alcohol are mixed and subjected to condensation reaction at a temperature of about 150° to about 300° C. under a normal, reduced or elevated pressure depending on the boiling point of the polyhydric alcohol for about 3 to about 40 hours while being stirred. When required, the condensation reaction can be performed in the presence of a solvent such as benzene, toluene, xylene and the like in an azeotropic state.

The rosin compound and the polyhydric alcohol are used essentially in a ratio of equivalent of hydroxyl group in polyhydric alcohol to equivalent of carboxyl group in rosin compound of 0.2–1.5:1. Preferred range is 0.4–1.2:1. Use of the rosin compound and polyhydric alcohol in a ratio of less than 0.2:1 is undesirable because the sizing agent used in neutral range exhibits insufficient sizing effect. Use of the rosin compound and polyhydric alcohol in a ratio of over 1.5:1 produces an ester of rosin compound and polyhydric alcohol containing a large amount of free hydroxyl groups, causing the sizing agent to achieve a reduced sizing effect due to the presence of remaining hydroxyl groups, hence undesirable.

The reaction thus made usually gives a reaction product comprising any of various combinations of: a complete esterification product wherein the hydroxyl groups of polyhydric alcohol are wholly esterified with the carboxyl groups of rosin compound; a partial esterification product wherein the hydroxyl groups of polyhydric alcohol are partially esterified with the carboxyl groups of rosin compound; and unreacted materials. According to the present invention, the reaction product is modified with the α,β-unsaturated carboxylic acid derivative under known modifying conditions. In other words, the component (iii) is added to the reaction product of the rosin compound (i) and polyhydric alcohol (ii) to effect subsequent reaction under conventional conditions. The contemplated reaction product is obtained by carrying out the reaction, for example, at a temperature of about 150° to about 250° C. for about 0.5 to about 24 hours.

The amount of the α,β-unsaturated carboxylic acid derivative (iii) to be used in the reaction is about 1 mole or less, preferably about 0.05 to about 0.75 mole, more preferably about 0.10 to about 0.70 mole, per mole of the rosin compound (i).

The polyhydric alcohol (ii) can be reacted after reaction of the rosin compound (i) and component (iii). In this case, the contemplated reaction product is prepared by modifying the rosin compound (i) with the α,β-sunsaturated carboxylic acid derivative (iii) under same modifying conditions as above, and reacting the resulting reaction product with the polyhydric alcohol (ii) in the above-specified ratio under the same esterifying conditions as above.

The rosin compound (i), polyhydric alcohol (ii) and component (iii) can be reacted at the same time. In this case, the rosin compound (i), the alcohol (ii) in the above ratio and the α,β-unsaturated carboxylic acid derivative (iii) are reacted usually at a temperature of about 150° to about 300° C. over about 3 to about 40 hours, thereby giving the contemplated reaction product.

In this way, a reaction product is prepared which is the dispersion phase of the sizing agent (B) in the present invention to be used in neutral range. The reaction product comprises any of various combinations of: α,β-unsaturated carboxylic acid derivative-modified rosin ester; rosin ester; α,β-unsaturated carboxylic acid derivative-modified rosin compound; and unreacted materials. The reaction product per se can be used as the dispersion phase of the sizing agent (B).

The reaction product thus obtained usually contains the α,β-unsaturated carboxylic acid derivative-modified rosin ester or the modified rosin ester and rosin ester unmodified with the carboxylic acid derivative in a combined amount of at least 20% by weight based on the total solids. A rosin compound, a α,β-unsaturated carboxylic acid derivative-modified rosin compound or the like may be added to the reaction product when required. In this case, the reaction product after addition contains the α,β-unsaturated carboxylic acid derivative-modified rosin ester and rosin ester in a combined amount of preferably at least 20% by weight, more preferably at least 40% by weight, based on the total solids. The content of more than 40% by weight serves to further improve the sizing property of sizing agent. Presence of less than 20% by weight gives a sizing agent which produces a lower sizing effect, hence undesirable.

The sizing agent of the present invention to be used in neutral range can be prepared by subjecting to a high pressure emulsification, phase inversion or the like the reaction product as the dispersion phase of the sizing agent (A), the reaction product as the dispersion phase of the sizing agent (B) or when required, a mixture of the reaction product with rosin compound, α,β-unsaturated carboxylic acid derivative-modified rosin compound or the like to obtain an aqueous dispersion. The high pressure emulsification is carried out as follows: the reaction product forming the dispersion phase is dissolved in benzene, toluene or like solvent, then an emulsifying agent and warm water are added to the solution, the mixture is emulsified by a high pressure emulsifying machine, and the solvent is distilled off, giving an aqueous dispersion. The phase inversion is conducted without use of a solvent as follows: the reaction product and an emulsifying agent are fully kneaded and warm water is added dropwise to the molten components with stirring, and phase inversion is effected, giving an aqueous dispersion.

Surfactants, protective colloids and the like are usable as the emulsifying agent without specific limitation. Examples of the surfactants are alkylbenzenesulfonate, alkylsulfate, rosin soap and like anionic emulsifying agents, polyethylene oxide, polypropylene oxide and like nonionic emulsifying agents, polyoxyethylenealkylphenylether sulfate, polyoxyethylenealkylphenylether sulfonate, polyoxyethylenealkylphenylether sulfosuccinate, polyoxyethylenedistyrylphenylether sulfate, polyoxyethylenedistyrylphenylether sulfosuccinate and like nonionic-anionic emulsifying agents, etc. Examples of useful protective colloids are casein, lecithin, polyvinyl alcohol, modified starches, etc. Fixing agents to be described later may be added before emulsification. The foregoing methods easily produce an aqueous dispersion usually having a solids concentration of about 10 to about 50% by weight which can be used as diluted when required.

The sizing agent thus obtained is used as described below in neutral range in the manufacture of paper. The sizing agent prepared above in the form of aqueous dispersion is added to a pulp slurry along with a filler, fixing agent, paper-strengthening agent and other additives. The amount of the aqueous dispersion is about 0.05 to about 2.0% by weight, preferably about 0.1 to about 1.0% by weight, based on the solids. Use of less than 0.05% by weight is undesirable because it is difficult to achieve sufficient sizing effect, whereas use of more than 2.0% by weight does not afford an improvement to the extent of the excess being justifiable. Useful filler is not specifically limited and can be any of conventional fillers. Further, calcium carbonate conventionally unusable in acid range can be used in the present invention, thereby contributing to decrease of papermaking costs. The fixing agent can be any of those known as useful for sizing agents in neutral range such as alkyl ketene dimer, alkenyl succinic anhydride and like agents. More specific examples thereof are cationic starches, epichlorohydrin-modified polyamide polyamine resin, epichlorohydrin-modified dicyandiamide resin, epichlorohydrin-modified styrene-dimethylaminoethyl methacrylate copolymer, Mannich-modified polyacrylamide, acrylamide-dimethylaminoethyl methacrylate copolymer, Hofmann degradation product of polyacrylamide, copolymer of dialkyldiallylammonium chloride and sulfur dioxide, etc. Aluminum sulfate to be used in acid range can be used in a small amount in which no significant reduction in pH occurs.

While the sizing agent of the present invention used singly can exhibit a satisfactory degree of sizing effect, it may be employed conjointly with a conventional sizing agent such as epichlorohydrin-modified styrenedimethylaminoethyl methacrylate copolymer, alkenyl succinic anhydride, alkyl ketene dimer, epichlorohydrinmodified fatty acid-polyalkylpolyamine condensate, etc.

The sizing operation using the sizing agent of the present invention is effected at a pH suitably determined over the range of about 6 to about 9. In this range, an outstanding sizing effect can be effectively achieved. Outside the range, the contemplated objects of the present invention are accomplished in insufficient degree.

According to the present invention, the following remarkable advantages can be given.

(i) The invention provides novel sizing agents to be used which can exhibit an excellent sizing effect in neutral range at a pH of about 6 to about 9.

(ii) The sizing agents of the invention have a high storage stability and can be used as they are, hence high in operational efficiency.

(iii) The sizing agents of the invention are inexpensive as compared with conventional sizing agents to be used in neutral range and accordingly can decrease the papermaking costs to a marked extent, coupled with the advantage of using calcium carbonate.

The present invention will be described below in more detail with reference to the following Examples and Comparison Examples to which, however, the present invention is limited in no way and in which all parts and percentages are by weight unless otherwise specified.

First, given below are Preparation Examples and Comparison Preparation Examples illustrating the preparation of reaction products as the dispersion phase of the sizing agent (A), and Examples and Comparison Examples illustrative of the preparation of the sizing agent (A) of the present invention using the reaction products thus obtained.

PREPARATION EXAMPLE 1

Gum rosin (100 parts) having an acid value of 170 and 8 parts of glycerin (equivalent ratio of —OH-/—COOH=0.86) were placed into a 1-liter flask equipped with a stirrer, thermometer, nitrogen-inlet tube, separator and condenser. The mixture was heated in a nitrogen atmosphere to 250° C. at which the mixture was subjected to esterification reaction for 12 hours, giving a reaction product having a softening point of 86° C. and an acid value of 32.

PREPARATION EXAMPLE 2

The general procedure of Preparation Example 1 was repeated with the exception of using glycerin in an amount of 2 parts (equivalent ratio=0.22), producing a reaction product having a softening point of 79° C. and an acid value of 126.

PREPARATION EXAMPLE 3

The general procedure of Preparation Example 1 was repeated with the exception of using glycerin in an amount of 4 parts (equivalent ratio=0.43), producing a reaction product having a softening point of 81° C. and an acid value of 91.

PREPARATION EXAMPLE 4

The general procedure of Preparation Example 1 was repeated with the exception of using glycerin in an amount of 6 parts (equivalent ratio=0.65), producing a reaction product having a softening point of 83° C. and an acid value of 64.

PREPARATION EXAMPLE 5

The general procedure of Preparation Example 1 was repeated with the exception of using glycerin in an amount of 12 parts (equivalent ratio=1.29), producing a reaction product having a softening point of 88° C. and an acid value of 8.

PREPARATION EXAMPLE 6

The general procedure of Preparation Example 1 was repeated with the exception of using tall oil rosin having an acid value of 170 in equal amount (equivalent ratio=0.86) in place of gum rosin used in Preparation Example 1, producing a reaction product having a softening point of 81° C. and an acid value of 34.

PREPARATION EXAMPLE 7

The general procedure of Preparation Example 1 was repeated with the exception of using hydrogenated rosin having an acid value of 160 in an an amount of 106 parts (equivalent ratio=0.86) in place of gum rosin used in Preparation Example 1, producing a reaction product having a softening point of 85° C. and an acid value of 30.

PREPARATION EXAMPLE 8

The general procedure of Preparation Example 1 was repeated with the exception of using formaldehyde-modified rosin (100 parts of gum rosin of Preparation Example 1 modified with 2 parts of formaldehyde) having an acid value of 168 in equal amount (equivalent ratio=0.86) in place of gum rosin used in Preparation Example 1, producing a reaction product having a softening point of 81° C. and an acid value of 29.

PREPARATION EXAMPLE 9

The general procedure of Preparation Example 1 was repeated with the exception of using 10.4 parts of trimethylolethane (equivalent ratio=0.86) in place of glycerin used in Preparation Example 1, and subjecting the mixture to esterification reaction at 250° C. for 30 hours, producing a reaction product having a softening point of 83° C. and an acid value of 30.

PREPARATION EXAMPLE 10

The general procedure of Preparation Example 1 was repeated with the exception of using 11.7 parts of trimethylolpropane (equivalent ratio=0.86) in place of glycerin used in Preparation Example 1, and subjecting the mixture to esterification reaction at 250° C. for 30 hours, producing a reaction product having a softening point of 86° C. and an acid value of 34.

PREPARATION EXAMPLE 11

The general procedure of Preparation Example 1 was repeated with the exception of using 10.8 parts of diglycerin (equivalent ratio=0.86) in place of glycerin used in Preparation Example 1, and subjecting the mixture to esterification reaction at 250° C. for 30 hours, producing a reaction product having a softening point of 89° C. and an acid value of 33.

PREPARATION EXAMPLE 12

The general procedure of Preparation Example 1 was repeated with the exception of using 8.85 parts of pentaerythritol (equivalent ratio=0.86) in place of glycerin used in Preparation Example 1, and subjecting the mixture to esterification reaction at 250° C. for 30 hours, producing a reaction product having a softening point of 98° C. and an acid value of 35.

COMPARISON PREPARATION EXAMPLE 1

The general procedure of Preparation Example 1 was repeated with the exception of using 1 part of glycerin (equivalent ratio=0.11), producing a reaction product having a softening point of 77° C. and an acid value of 150.

COMPARISON PREPARATION EXAMPLE 2

The general procedure of Preparation Example 1 was repeated with the exception of using 20 parts of glycerin (equivalent ratio=2.2), and subjecting the mixture to esterification reaction at 250° C. for 30 hours, producing a reaction product having a softening point of 91° C. and an acid value of 3.

COMPARISON PREPARATION EXAMPLE 3

The general procedure of Preparation Example 1 was repeated with the exception of using 8.1 parts of ethylene glycol (equivalent ratio=0.86) in place of glycerin used in Preparation Example 1, and subjecting the mixture to esterification reaction at 200° C. for 20 hours, producing a reaction product having a softening point of 65° C. and an acid value of 40.

COMPARISON PREPARATION EXAMPLE 4

The general procedure of Preparation Example 1 was repeated with the exception of using 12.5 parts of neopentyl glycol (equivalent ratio=0.86) in place of glycerin used in Preparation Example 1, and subjecting the mixture to esterification reaction at 200° C. for 20 hours, producing a reaction product having a softening point of 68° C. and an acid value of 38.

COMPARISON PREPARATION EXAMPLE 5

The general procedure of Preparation Example 1 was repeated with the exception of using 9.9 parts of propylene glycol (equivalent ratio=0.86) in place of glycerin used in Preparation Example 1, and subjecting the mixture to esterification reaction at 200° C. for 20 hours, producing a reaction product having a softening point of 67° C. and an acid value of 40.

COMPARISON PREPARATION EXAMPLE 6

The general procedure of Preparation Example 1 was repeated with the exception of using 12.9 parts of triethanolamine (equivalent ratio=0.86) in place of glycerin used in Preparation Example 1, and subjecting the mixture to esterification reaction at 250° C. for 30 hours, producing a reaction product having a softening point of 70° C. and an acid value of 37.

COMPARISON PREPARATION EXAMPLE 7

The general procedure of Preparation Example 1 was repeated with the exception of using 22.6 parts of tris(2-hydroxyethyl)isocyanurate (equivalent ratio=0.86) in place of glycerin used in Preparation Example 1, and subjecting the mixture to esterification reaction at 250° C. for 30 hours, producing a reaction product having a softening point of 89° C. and an acid value of 36.

EXAMPLES 1 TO 12

A 200 part portion of each of reaction products prepared in Preparation Examples 1 to 12 was dissolved in 200 parts of toluene, and the solution was mixed with 10 parts of an emulsifying agent (ammonium salt of polyoxyethylenedistyrylphenylether sulfuric acid) and 800 parts of warm water (60° C.). The mixture was emulsified by a high pressure emulsifying machine. The toluene was removed by distillation from the emulsion, giving an aqueous dispersion having a concentration of 21%.

Using the aqueous dispersion obtained above as the sizing agent (A) of the present invention, paper sizing was effected according to the sizing method of the present invention to produce paper. The sizing effect was determined by the following methods.

<Method I>

Pulp (L-BKP) was subjected to beating to a Canadian standard freeness of 450 ml, giving a 1% slurry. Calcium carbonate was added as a filler in an amount of 20%, calculated as solids based on the pulp, followed by addition of 1% of aluminum sulfate and 1% of cationic starch (tradename "Cato 15," product of Oji National Company, Ltd.) Each of the sizing agents obtained in the Examples was added in an amount of 0.4% based on the pulp and 0.02% of a filler retention aid (tradename "Percal 47," product of Areid Colloid, Ltd.) was added. The mixture was agitated to obtain a uniform dispersion. The pulp slurry thus prepared had a pH of 7.8 and was processed into sheets of paper each weighing 70 g/m$^2$ by a Tappi standard sheet machine. The wet paper sheets thus obtained were dewatered and dried at 100° C. for 1 minute. The dried sheets were treated for humidity control at a relative humidity of 65% for 24 hours and then the sizing degree (second) was evaluated according to Stöckigt method (JIS P8122).

<Method II>

The same procedure of Method I was repeated with the exception of not using aluminum sulfate and the sizing degree (second) of paper sheets was measured. The pulp slurry used had a pH of 8.2.

<Method III>

Pulp (L-BKP) was subjected to beating to a Canadian standard freeness of 450 ml to obtain a 1% slurry. To the slurry was added a polyamide polyamine cationic polymer (tradename "ARAFIX-100," product of Arakawa Chemical Industries, Ltd.) in an amount of 0.3%, calculated as solids based on the pulp. Each of the sizing agents prepared in the Examples were added in an amount of 0.5% based on the pulp and the mixture was stirred to give a uniform dispersion. The pulp slurry thus obtained was 7.2 in pH. The pulp slurry was sized with the stirring agent by the foregoing method to produce paper. After drying and treatment for humidity control, the sizing degree of sheets (second) was measured by Stöckigt method.

COMPARISON EXAMPLES 1 TO 7

The reaction products obtained in Comparison Preparation Examples 1 to 7 were made in the same manner as in Example 1 into aqueous dispersions each having a 21% concentration.

The sizing agents prepared in Comparison Examples 1 to 7 were used to effect paper sizing in the same manner as for the sizing agents in Examples, and the sizing degree of paper sheets was measured.

Table 1 below shows the results.

TABLE 1

| Method | Stöckigt sizing degree (sec) | | |
|---|---|---|---|
| | Method I | Method II | Method III |
| Example | | | |
| 1 | 30.0 | 27.0 | 25.0 |
| 2 | 15.0 | 12.0 | 12.0 |
| 3 | 22.0 | 20.0 | 19.0 |
| 4 | 27.0 | 24.0 | 24.0 |
| 5 | 26.0 | 23.0 | 20.0 |
| 6 | 28.0 | 26.0 | 24.0 |
| 7 | 28.0 | 25.0 | 23.0 |
| 8 | 26.0 | 21.0 | 20.0 |
| 9 | 30.0 | 26.0 | 25.0 |
| 10 | 33.0 | 28.5 | 28.0 |
| 11 | 29.0 | 25.0 | 25.5 |
| 12 | 33.0 | 28.0 | 28.0 |
| Comp. Example | | | |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |

Given below are Preparation Examples and Comparison Preparation Examples illustrating the preparation of the reaction products as the dispersion phase of the sizing agent (B), and Examples and Comparison Examples illustrative of the preparation of the sizing agent (B) of the invention using the reaction products thus obtained.

PREPARATION EXAMPLE 13

Gum rosin (100 parts) having an acid value of 170 and 8 parts of glycerin (equivalent ratio of —OH/—COOH=0.86) were placed into a 1-liter flask equipped with a stirrer, thermometer, nitrogen-inlet tube, separator and condenser. The mixture was heated in a nitrogen atmosphere to 250° C. at which the mixture was subjected to esterification reaction for 12 hours, giving a reaction product having a softening point of 86° C. and an acid value of 32. The reaction product was heated to a temperature of 180° C. and 9 parts of maleic anhydride was added. The mixture was heated to 210° C. and maintained at the same temperature for 2 hours, affording a reaction product having a softening point of 109° C. and an acid value of 122.

PREPARATION EXAMPLE 14

The general procedure of Preparation Example 13 was repeated with the exception of using glycerin in an amount of 2 parts (equivalent ratio=0.22), producing a reaction product having a softening point of 96° C. and an acid value of 212.

PREPARATION EXAMPLE 15

The general procedure of Preparation Example 13 was repeated with the exception of using glycerin in an amount of 4 parts (equivalent ratio=0.43), producing a reaction product having a softening point of 102° C. and an acid value of 183.

PREPARATION EXAMPLE 16

The general procedure of Preparation Example 13 was repeated with the exception of using glycerin in an amount of 6 parts (equivalent ratio=0.65), producing reaction product having a softening point of 105° C. and an acid value of 153.

PREPARATION EXAMPLE 17

The general procedure of Preparation Example 13 was repeated with the exception of using glycerin in an amount of 12 parts (equivalent ratio=1.29), producing a reaction product having a softening point of 115° C. and an acid value of 90.

PREPARATION EXAMPLE 18

The general procedure of Preparation Example 13 was repeated with the exception of using tall oil rosin having an acid value of 170 in equal amount (equivalent ratio=0.86) in place of gum rosin used in Preparation Example 13, producing a reaction product having a softening point of 100° C. and an acid value of 124.

PREPARATION EXAMPLE 19

The general procedure of Preparation Example 13 was repeated with the exception of using 5 parts of maleic anhydride, producing a reaction product having a softening point of 99° C. and an acid value of 86.

PREPARATION EXAMPLE 20

The general procedure of Preparation Example 13 was repeated with the exception of using 16 parts of maleic anhydride, producing a reaction product having a softening point of 122° C. and an acid value of 185.

PREPARATION EXAMPLE 21

Gum rosin (100 parts) with an acid value of 170 and 9 parts of maleic anhydride were heated to 210° C. for 2 hours and maintained at the same temperature, 8 parts of glycerin (equivalent ratio=0.86) was added and the mixture was heated to 250° C. and subjected to esterification reaction for 12 hours, producing a reaction product having a softening point of 116° C. and an acid value of 117.

PREPARATION EXAMPLE 22

Gum rosin (100 parts) with an acid value of 170, 9 parts of maleic anhydride and 8 parts of glycerin (equivalent ratio=0.86) were mixed, heated to 250° C. and subjected to reaction for 12 hours, producing a reaction product having a softening point of 118° C. and an acid value of 115.

PREPARATION EXAMPLE 23

The general procedure of Preparation Example 13 was repeated with the exception of using 10.7 parts of fumaric acid in place of maleic anhydride used in Preparation Example 13, producing a reaction product having a softening point of 130° C. and an acid value of 122.

PREPARATION EXAMPLE 24

The general procedure of Preparation Example 13 was repeated with the exception of using 15.8 parts of diethyl maleate in place of maleic anhydride used in Preparation Example 13, producing a reaction product in pasty form having an acid value of 28.

PREPARATION EXAMPLE 25

The general procedure of Preparation Example 13 was repeated with the exception of using 13.2 parts of monoethyl maleate in place of maleic anhydride used in Preparation Example 13, producing a reaction product having a softening point of 79° C. and an acid value of 70.

PREPARATION EXAMPLE 26

The general procedure of Preparation Example 13 was repeated with the exception of using 10.3 parts of itaconic anhydride in place of maleic anhydride used in Preparation Example 13, producing a reaction product having a softening point of 110° C. and an acid value of 120.

PREPARATION EXAMPLE 27

The general procedure of Preparation Example 13 was repeated with the exception of using 10.4 parts of trimethylolethane (equivalent ratio=0.86) in place of glycerin used in Preparation Example 13, and subjecting the mixture to esterification reaction at 250° C. for 30 hours, producing a reaction product having a softening point of 110° C. and an acid value of 120.

PREPARATION EXAMPLE 28

The general procedure of Preparation Example 13 was repeated with the exception of using 11.7 parts of trimethylolpropane (equivalent ratio=0.86) in place of glycerin used in Preparation Example 13, and subjecting the mixture to esterification reaction at 250° C. for 30 hours, producing a reaction product having a softening point of 113° C. and an acid value of 120.

PREPARATION EXAMPLE 29

The general procedure of Preparation Example 13 was repeated with the exception of using 10.8 parts of diglycerin (equivalent ratio=0.86) in place of glycerin used in Preparation Example 13, and subjecting the mixture to esterification reaction at 250° C. for 30 hours, producing a reaction product having a softening point of 114° C. and an acid value of 121.

PREPARATION EXAMPLE 30

The general procedure of Preparation Example 13 was repeated with the exception of using 8.85 parts of pentaerythritol (equivalent ratio=0.86) in place of glycerin used in Preparation Example 13, and subjecting the mixture to esterification reaction at 250° C. for 30 hours, producing a reaction product having a softening point of 122° C. and an acid value of 119.

COMPARISON PREPARATION EXAMPLE 8

Gum rosin (100 parts) with an acid value of 170, and 9 parts of maleic anhydride were heated to 210° C. for 2 hours, producing a reaction product having a softening point of 98° C. and an acid value of 252.

COMPARISON PREPARATION EXAMPLE 9

The general procedure of Preparation Example 13 was conducted by performing only the esterification reaction without adding maleic anhydride, producing a reaction product having a softening point of 86° C. and an acid value of 32.

COMPARISON PREPARATION EXAMPLE 10

The general procedure of Preparation Example 13 was repeated with the exception of using 1 part of glycerin (equivalent ratio=0.11), producing a reaction product having a softening point of 93° C. and an acid value of 232.

COMPARISON PREPARATION EXAMPLE 11

The general procedure of Preparation Example 13 was repeated with the exception of using 20 parts of glycerin (equivalent ratio=2.2) and subjecting the mixture to esterification reaction at 250° C. for 30 hours, producing a reaction product having a softening point of 119° C. and an acid value of 60.

COMPARISON PREPARATION EXAMPLE 12

The general procedure of Preparation Example 13 was repeated with the exception of using 8.1 parts of ethylene glycol (equivalent ratio=0.86) in place of glycerin used in Preparation Example 13 and subjecting the mixture to esterification reaction at 200° C. for 20 hours, producing a reaction product having a softening point of 88° C. and an acid value of 130.

COMPARISON PREPARATION EXAMPLE 13

The general procedure of Preparation Example 13 was repeated with the exception of using 12.5 parts of neopentyl glycol (equivalent ratio=0.86) in place of glycerin used in Preparation Example 13 and subjecting the mixture to esterification reaction at 200° C. for 20 hours, producing a reaction product having a softening point of 91° C. and an acid value of 128.

COMPARISON PREPARATION EXAMPLE 14

The general procedure of Preparation Example 13 was repeated with the exception of using 12.9 parts of triethanolamine (equivalent ratio=0.86) in place of glycerin used in Preparation Example 13 and subjecting the mixture to esterification reaction at 250° C. for 30 hours, producing a reaction product having a softening point of 93° C. and an acid value of 127.

COMPARISON PREPARATION EXAMPLE 15

The general procedure of Preparation Example 13 was repeated with the exception of using 22.6 parts of tris(2-hydroxyethyl)isocyanurate (equivalent ratio=0.86) in place of glycerin used in Preparation Example 13 and subjecting the mixture to esterification reaction at 250° C. for 30 hours, producing a reaction product having a softening point of 112° C. and an acid value of 126.

EXAMPLES 13 TO 30

A 200 parts quantity of each of reaction products prepared in Preparation Examples 13 to 30 was dissolved in 200 parts of toluene, and the solution was mixed with 10 parts of an emulsifying agent (ammonium salt of polyoxyethylenedistyrylphenylether sulfuric acid) and 800 parts of warm water (60° C.). The mixture was emulsified by a high pressure emulsifying machine. The toluene was removed by distillation from the emulsion, giving an aqueous dispersion having a concentration of 21%.

Using the aqueous dispersion obtained above as the sizing agent (B) of the present invention, paper sizing was effected according to the sizing method of the present invention to produce paper. Then the sizing degree of sheets was measured.

Method I was conducted with the exception of using the sizing agent in an amount of 0.3% based on the pulp. Method II was repeated without any change. Method III was performed with the exception of using the sizing agent in an amount of 0.4% based on the pulp.

COMPARISON EXAMPLES 8 TO 15

The reaction products obtained in Comparison Preparation Examples 8 to 15 were made into aqueous dispersions each having a 21% concentration in the same manner as in Example 13.

Using the sizing agents prepared in Comparison Examples 8 to 15, paper sizing was performed in the same manner as for the agents in the Examples, and the sizing degree of paper sheets was measured.

Table 2 below shows the results.

TABLE 2

| Method | Stöckigt sizing degree (sec) | | |
|---|---|---|---|
| | Method I | Method II | Method III |
| Example | | | |
| 13 | 32.0 | 27.0 | 33.0 |
| 14 | 18.0 | 10.0 | 18.0 |
| 15 | 28.0 | 20.0 | 27.0 |
| 16 | 30.0 | 25.0 | 30.0 |
| 17 | 28.0 | 25.0 | 29.0 |
| 18 | 31.0 | 26.0 | 32.0 |
| 19 | 30.0 | 25.5 | 30.5 |
| 20 | 33.5 | 28.5 | 33.5 |
| 21 | 30.0 | 25.0 | 30.0 |
| 22 | 30.5 | 25.5 | 30.0 |
| 23 | 22.0 | 14.0 | 22.0 |
| 24 | 21.0 | 13.0 | 20.0 |
| 25 | 29.0 | 26.0 | 31.0 |
| 26 | 31.0 | 27.0 | 31.0 |
| 27 | 31.0 | 29.0 | 30.0 |
| 28 | 30.0 | 28.0 | 29.0 |
| 29 | 30.0 | 29.0 | 30.5 |
| 30 | 29.0 | 27.0 | 28.0 |
| Comp. Example | | | |
| 8 | 0 | 0 | 0 |
| 9 | 12.0 | 7.0 | 13.0 |
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |

We claim:

1. A neutral sizing agent comprising an aqueous dispersion of a reaction product prepared by reacting (i) a rosin compound and (ii) at least one polyhydric alcohol selected from the group consisting of trihydric alcohol and tetrahydric alcohol both consisting of carbon, hydrogen and oxygen in such proportion that the ratio of equivalent of hydroxyl group in the polyhydric alcohol (ii) to equivalent of carboxyl group in the rosin compound (i) is 0.4–1.5:1.

2. A neutral sizing agent according to claim 1 wherein the trihydric alcohol and tetrahydric alcohol are those having about 3 to about 7 carbon atoms.

3. A neutral sizing agent according to claim 2 wherein the trihydric alcohol is at least one alcohol selected from the group consisting of glycerin, trimethylolethane, trimethylolpropane and 3-methylpentane-1,3,5-triol.

4. A neutral sizing agent according to claim 2 wherein the tetrahydric alcohol is at least one alcohol selected from the group consisting of pentaerythritol and diglycerin.

5. A neutral sizing agent according to claim 1 wherein the ratio of equivalent of hydroxyl group in the polyhydric alcohol (ii) to equivalent of carboxyl group in the rosin compound (i) is 0.4–1.2:1.

6. A sizing method comprising adding the neutral sizing agent of claim 1 in an amount of at least about 0.05% by weight based on the solids to a pulp slurry along with a filler, a fixing agent and a paper-strengthening agent, and effecting the sizing at a pH range of about 6 to about 9.

7. A neutral sizing agent according to claim 1 wherein the rosin compound is at least one compound selected from the group consisting of gum rosin, wood rosin and modified rosin thereof.

8. A neutral sizing agent comprising an aqueous dispersion of a reaction product prepared by reacting (i) a rosin compound (ii) at least one polyhydric alcohol selected from the group consisting of trihydric alcohol and tetrahydric alcohol both consisting of carbon, hydrogen and oxygen and (iii) a α,β-unsaturated carboxylic acid derivative in such proportion that the ratio of equivalent of hydroxyl group in the polyhydric alcohol (ii) to equivalent of carboxyl group in the rosin compound (i) is 0.4–1.5:1.

9. A neutral sizing agent according to claim 8 wherein the trihydric alcohol and tetrahydric alcohol are those having about 3 to about 7 carbon atoms.

10. A neutral sizing agent according to claim 9 wherein the trihydric alcohol is at least one alcohol selected from the group consisting of glycerin, trimethylolethane, trimethylolpropane and 3-methylpentane-1,3,5-triol.

11. A neutral sizing agent according to claim 9 wherein the tetrahydric alcohol is at least one alcohol selected from the group consisting of pentaerythritol and diglycerin.

12. A neutral sizing agent according to claim 8 wherein the α,β-unsaturated carboxylic acid derivative is at least one derivative selected from the group consisting of maleic anhydride, maleic acid, monoester or diester of maleic acid prepared from lower alcohol and maleic anhydride, fumaric acid, N-alkylmaleimide, itaconic acid and itaconic anhydride.

13. A neutral sizing agent according to claim 12 wherein the α,β-unsaturated carboxylic acid derivative is at least one derivative selected from the group consisting of maleic anhydride, maleic acid, monoester of maleic acid, itaconic acid and itaconic anhydride.

14. A neutral sizing agent according to claim 8 wherein the ratio of equivalent of hydroxyl group in the polyhydric alcohol (ii) to equivalent of carboxyl group in the rosin compound (i) is 0.4–1.2:1.

15. A sizing method comprising adding the neutral sizing agent of claim 8 in an amount of at least about 0.05% by weight based on the solids to a pulp slurry along with a filler, a fixing agent and a paper-strengthening agent, and effecting the sizing at a pH range of about 6 to about 9.

16. A neutral sizing agent according to claim 8 wherein the rosin compound is at least one compound selected from the group consisting of gum rosin, wood rosin and modified rosin thereof.

* * * * *